(12) United States Patent
Gretz

(10) Patent No.: US 6,378,813 B1
(45) Date of Patent: Apr. 30, 2002

(54) CABLE SUPPORT

(75) Inventor: Thomas J. Gretz, Clarks Summit, PA (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 09/833,140

(22) Filed: Apr. 12, 2001

Related U.S. Application Data

(63) Continuation of application No. 09/329,441, filed on Jun. 10, 1999.

(51) Int. Cl.$^7$ ................................................ F16L 3/22
(52) U.S. Cl. ......................... 248/68.1; 248/71; 248/73
(58) Field of Search ........................ 248/71, 73, 74.1, 248/68.1; 211/49.1, 126.12, 194, 59.4; 174/40 CC, 141 R, 158 R, 53, 75 C, 84 C

(56) References Cited

U.S. PATENT DOCUMENTS

| | | | | |
|---|---|---|---|---|
| 3,241,797 A | * | 3/1966 | Anderson | 248/71 |
| 3,430,903 A | * | 3/1969 | Mathes | 248/68.1 |
| 3,531,071 A | * | 9/1970 | Kubli | 248/68.1 |
| 3,695,563 A | * | 10/1972 | Evans | 248/58 |
| 4,395,009 A | * | 7/1983 | Bormke | 174/157 |
| 4,502,598 A | * | 3/1985 | Wartenbergh | 206/308.3 |
| 4,801,061 A | * | 1/1989 | Mangone, Jr. | 227/120 |
| 4,801,064 A | * | 1/1989 | Mangone, Jr. | 227/120 |
| 4,903,921 A | * | 2/1990 | Logsdon | 248/74.5 |
| 5,201,484 A | * | 4/1993 | Thoen | 248/68.1 |
| 5,350,267 A | * | 9/1994 | Mangone, Jr. | 411/442 |
| 5,411,228 A | * | 5/1995 | Morawa et al. | 248/74.5 |
| 5,612,509 A | * | 3/1997 | Markel | 174/53 |
| 5,615,852 A | * | 4/1997 | Heidorn et al. | 248/74.5 |
| 5,617,953 A | * | 4/1997 | Cope | 206/501 |
| 5,739,474 A | * | 4/1998 | Bradley | 1745/135 |
| 5,941,483 A | * | 8/1999 | Baginski | 248/68.1 |
| 6,010,100 A | * | 1/2000 | Merritt | 248/74.5 |
| 6,073,891 A | * | 6/2000 | Humber | 248/74.5 |
| 6,116,547 A | * | 9/2000 | Johnson et al. | 248/49 |
| 6,173,926 B1 | * | 1/2001 | Elvegaard | 248/74.1 |

FOREIGN PATENT DOCUMENTS

| | | | |
|---|---|---|---|
| DE | 3818362 A1 | * | 12/1989 |
| EP | 191480 A2 | * | 8/1986 |
| GB | 2165099 A | * | 4/1986 |

* cited by examiner

*Primary Examiner*—Leslie A. Braun
*Assistant Examiner*—Naschica S Morrison

(57) ABSTRACT

The present invention provides a generally arch shaped cable, support having a portal suitable for the receipt of armored or metal clad cable and including in its leg members apertures suitable for the receipt of fasteners that permit attachment of the cable support to an underlying structure or vertically to another cable support. According to a preferred embodiment, tabs are provided on the upper inside surface of the portal to assist with horizontal alignment of serially stacked such supports. According to a further preferred embodiment, the interior curved section of the arch is provided with tabs that engage the grooves in the metal cladding of an inserted cable to inhibit movement of the cable in the support.

4 Claims, 3 Drawing Sheets

CABLE SUPPORT

This application is a continuation of U.S. patent application Ser. No. 09/329,441, filed Jun. 10, 1999.

FIELD OF THE INVENTION

The present invention relates to a support for so-called MC or metal-clad electrical cable and more specifically to such devices that, because of their design, are stackable.

BACKGROUND OF THE INVENTION

With the ever increasing usage of MC or armored cable in lieu of conduit contained cable or wiring for buildings of a commercial or industrial nature there has occurred a concomitant proliferation of devices to support such cable at the code required every ten feet and within one foot of a panel box.

While existing devices that generally comprise a simple metal strap with a fastener hole therein have proven adequate for supporting the cable, their installation sometimes proves difficult when a large number of cables are to be installed in a confined space. This is especially true because of code requirements that force location of such cable supports to a point at or near the center of a joist or stud. Consequently, there has arisen a need for a reliable cable support that permits easy supporting in a space where several cables are to be installed in parallel arrangement. One option in such cases is stacking the cables in a series of supports; however, currently utilized "strap-type" supports are not stackable.

OBJECT OF THE INVENTION

It is therefore an object of the present invention to provide a cable support that permits ready support of multiple cables, each in its own supporting structure, in a confined space.

SUMMARY OF THE INVENTION

The present invention provides a generally arch shaped cable support having a portal suitable for the receipt of armored or metal clad cable and including in its leg members apertures suitable for the receipt of fasteners that permit attachment of the cable support to an underlying structure or vertically to another cable support. According to a preferred embodiment, tabs are provided on the upper in side surface of the portal to assist with horizontal alignment of serially stacked supports. According to a further preferred embodiment, the interior curved section of the arch is provided with tabs that engage the grooves in the metal cladding of an inserted cable to inhibit movement of the cable in the support.

DETAILED DESCRIPTION

Figure 1:
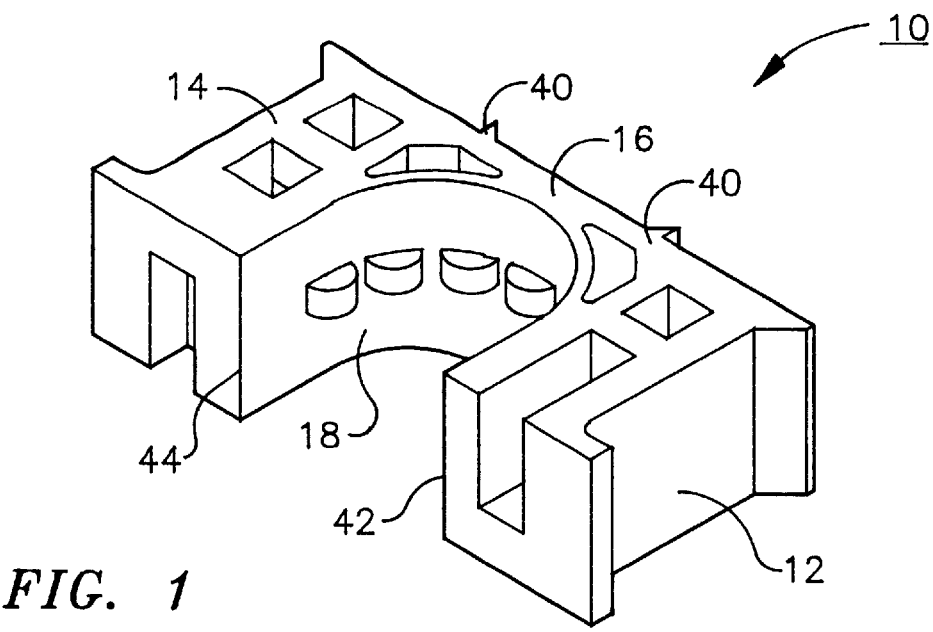
FIG. 1 is a top isometric view of the cable support of the present invention.
Figure 2:
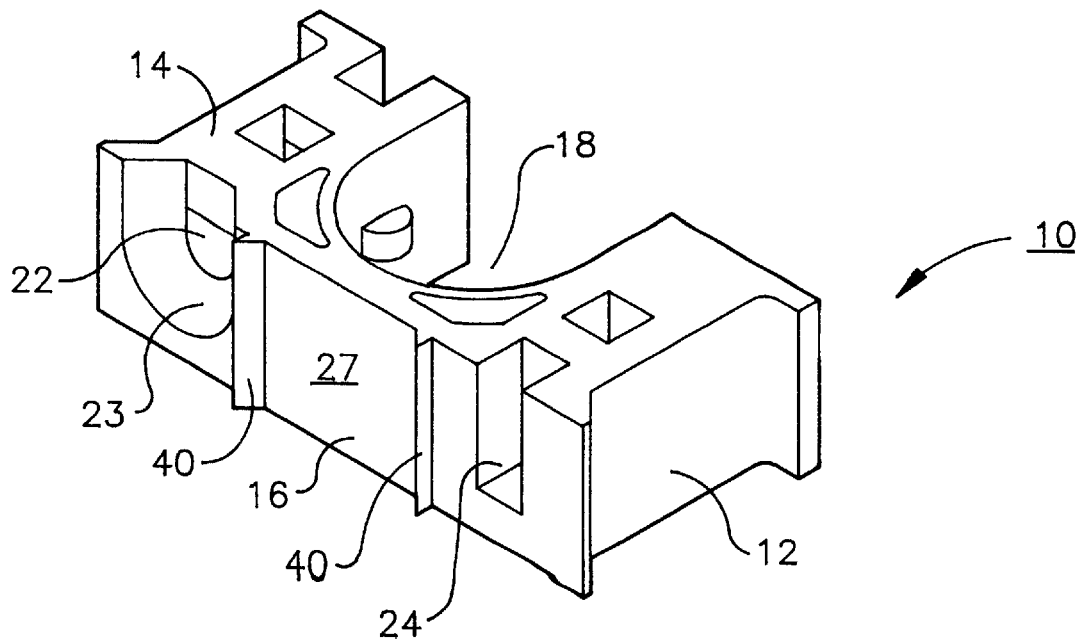
FIG. 2 is a bottom isometric view of the cable support of the present invention.
Figure 3:
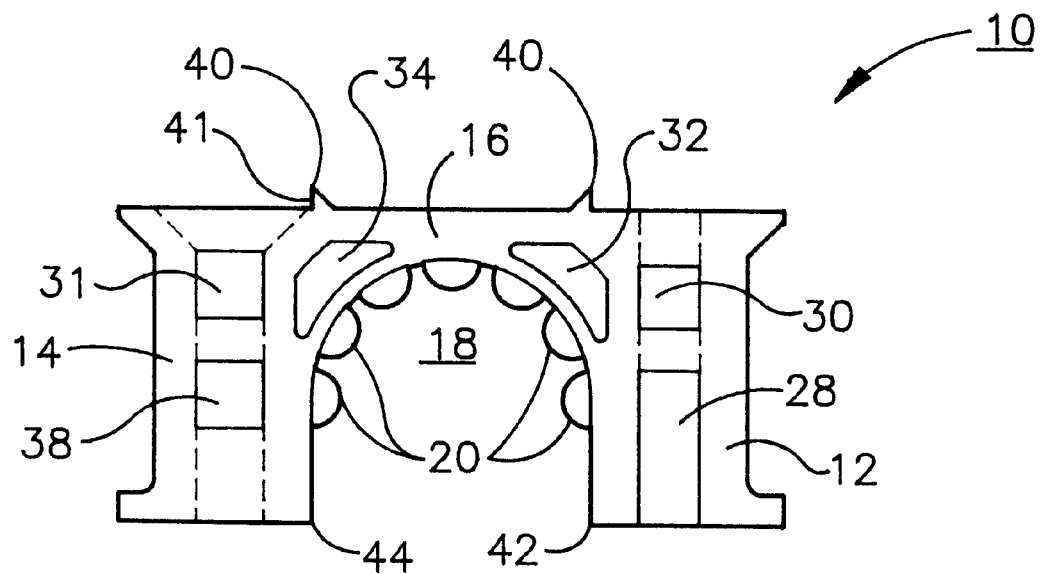
FIG. 3 is a front view of the cable support of the present invention.
Figure 4:
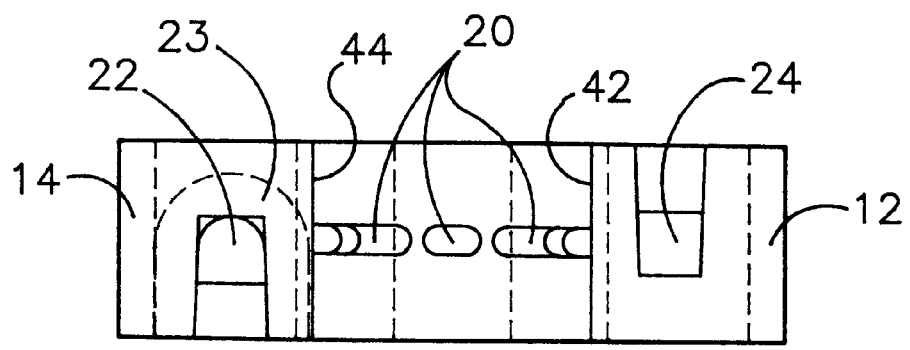
FIG. 4 is a bottom view of the cable support of the present invention.

As shown in FIG. 3, the cable support 10 of the present invention is generally arch shaped and includes a pair of legs 12 and 14, joined by a span 16 that together define a portal 18. Within portal 18, about its upper inner periphery or curved surface, are semi-rigid or resilient tabs 20 that serve to engage the grooves in the surface of an inserted metal-clad cable 46A as described below. The engagement of tabs 20 with the grooves in the outer surface of an inserted cable inhibits movement of metal-clad cable 46A within cable support 10.

Figure 5:
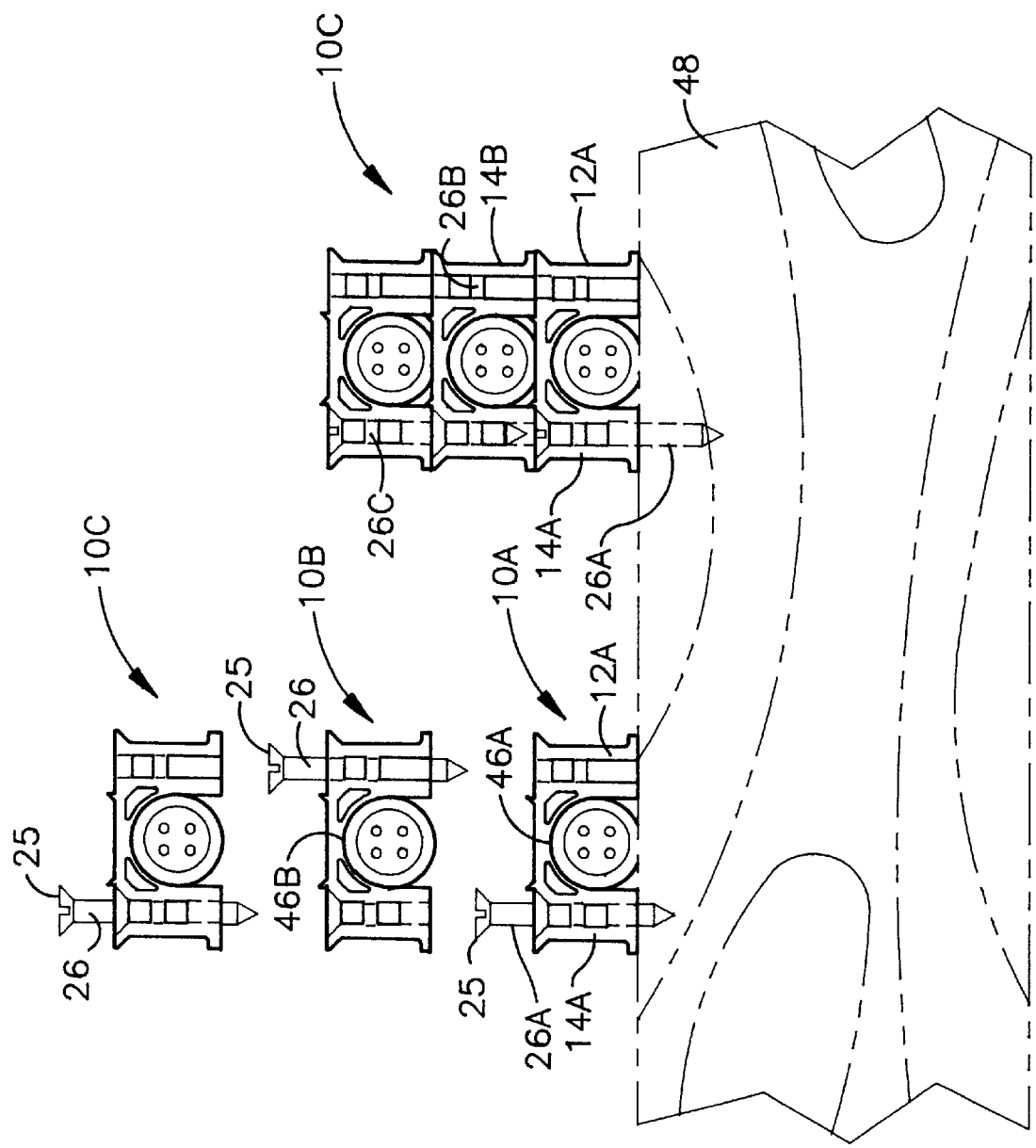
FIG. 5 is a front view showing the stacking of the cable support of the present invention.

Vertically through each of legs 12 and 14 is are screw holes 22 and 24 that serve to frictionally engage an inserted screw 26 as shown in FIG. 5. The difference between screw holes 22 and 24 is that screw hole 22 is provided with a recess 23 at its uppermost end to permit recessed seating of head 25 of inserted screw 26 so as to provide a flat surface 27 at the top surface of span 16. This provision of flat surface 27 permits easy and snug engagement or nesting of overlying supports 10 as described below and shown in FIG. 5. A recess is not required in screw hole 24, since, as described below, it is not necessary that a screw 26 be inserted directly into screw hole 24, but merely that screw hole 24 be capable of receiving a screw 26 that has been inserted into and tightened in a mating screw hole 22 and then passes into screw hole 24 for final connection. Of course, screw hole 24 could be equipped with a recess 23, if it were desired.

It should be noted at this point, that the various apertures such as those located at 28, 30, 32, 34, 36, and 38 are merely material saving features and serve no functional role in the successful practice of the present invention. Thus, while the presence of these apertures is preferred from a cost standpoint, cable support 10 could be an entirely solid shape without these various apertures and still perform the function for which it was designed. Such apertures merely reduce the amount of material that must be used to fabricate the cable support of the present invention without affecting its structural properties in the utility for which it is intended.

Similarly, the various other extensions of legs 12 and 14 and surface 27 depicted in the drawings serve only to increase the footprint of cable support 10 and may be of any suitable design that does not negatively impact the functionality of cable support 10 as described herein.

It is preferred that upper surface 27 be equipped with a pair of parallel ridges 40 as shown most clearly in FIG. 3. Parallel ridges 40 preferably extend parallel to portal 18 across the width of surface 27 and serve to engage the inner bottom corners 42 and 44 of legs 12 and 14 to permit nesting of two cable supports 10, when a series of cable supports 10 are stacked as shown in FIG. 5. Consequently, it is desire that the distance between parallel ridges 40 approximate the distance between bottom corners 42 and 44 of legs 12 and 14. Surfaces 41, i.e. those surfaces that engage corners 42 and 44 of legs 12 and 14 in a stacked configuration, preferably extend at an angle of about 90° from surface 27 to assure optimum engagement.

Turning now to FIG. 5, this Figure demonstrates the stacking of the cable supports of the present invention. As shown on the left of FIG. 5, a first cable support 10A, that includes a mounting screw 26A, is placed over a cable 46A that abuts a structural member such as a stud or joist 48. In this configuration, tabs 20A engage the grooves in the outer surface of cable 46A and consequently, cannot be seen. Screw 26A is then tightened as shown on the left side of FIG. 5 until head 25 of screw 26 is properly seated in recess 23A at the top of leg 14 A. At this point, a single cable 46A has been securely fastened to structural member 48. To attach a second cable support 10B to provide a stack, second cable 46B is located abutting upper surface 27A of cable support 10A, cable support 10B is placed over cable support 10A, cable 46B with the aid of ridges 40A engaging corners 42B and 44B such that leg 14B containing screw 26B registers leg 12A, screw hole 22B registers with screw hole 24A, and screw 26B tightened appropriately. Tightening of screw 26B, because of the length of screw 26B causes screw 26B to engage hole 24A thereby joining the assembly together. This process is continued with support 10C etc. until an appropriate stack has been obtained. As a practical matter, a stack of three to four cable supports 10 is probably a maximum.

Cable support 10 is preferably fabricated from a plastic material by injection molding or otherwise. Materials such as polyethylene, polypropylene, polyvinyl chloride and various copolymers of such materials have been found suitable for manufacture of such cable supports.

As the invention has been described, it will be apparent to those skilled in the art that the same may be varied in any ways without departing from the spirit and scope of the invention. Any and all such modifications are intended to be included within the scope of the appended claims.

What is claimed is:

1. A cable support for metal-clad cable having grooves in the outer surface thereof comprising:

a pair of parallel legs having inside corners spaced apart a distance;

a span joining said parallel legs, said span and said parallel legs together defining an arch having a portal therein, said portal having an inner curved top surface and a flat outer surface;

vertical apertures through the length of said parallel legs suitable for frictionally engaging a screw rotatably inserted therein;

at least one recess in said flat outer surface about one of said vertical apertures, and at a point where, said vertical apertures pass through said flat outer surface; and a pair of parallel ridges on said flat outer surface extending parallel to said portal and spaced a distance apart approximately equal to the distance between said spaced apart inner corners the incorporation of said pair of parallel ridges rendering said cable support stackable with a similar such device when said pair of parallel ridges engage said spaced apart inner corners in a stacked configuration.

2. The cable support of claim 1 further including a screw mounted in said vertical aperture that includes said recess.

3. The cable support of claim 2 including tabs extending from said inner curved surface such that said tabs engage grooves in the outer surface of a metal-clad cable inserted into said portal.

4. The cable support of claim 3 wherein said tabs are semi-rigid.

* * * * *